United States Patent [19]

Jezbera

[11] 4,442,754
[45] Apr. 17, 1984

[54] ROBOTICS POSITIONING SYSTEM

[76] Inventor: Vladimir K. Jezbera, 642 Encino Vista Dr., Thousand Oaks, Calif. 91630

[21] Appl. No.: 196,666

[22] Filed: Oct. 14, 1980

[51] Int. Cl.³ .............................................. F01B 25/26
[52] U.S. Cl. ............................................ 91/1; 91/36; 92/8; 92/13.3; 92/13.6
[58] Field of Search ........................ 92/13.3, 5 R, 13.6, 92/8, 143, 129, 12, 61; 91/170, 1, 36

[56] References Cited

U.S. PATENT DOCUMENTS

| 2,441,264 | 5/1948 | Eaton | 92/8 |
| 2,473,507 | 6/1949 | Bullard . | |
| 2,752,989 | 7/1956 | Jenkins, Jr. | 92/13.3 |
| 2,980,062 | 4/1961 | Ohle | 92/12 |
| 3,090,360 | 5/1963 | Bennett | 92/61 |
| 3,148,595 | 9/1964 | Looney | 92/13.3 |
| 3,303,755 | 2/1967 | Linker | 92/5 R |
| 4,111,311 | 9/1978 | Hirama | 92/12 |
| 4,225,110 | 9/1980 | Akkerman | 92/13.3 |
| 4,311,086 | 1/1982 | Schoen | 92/143 |

FOREIGN PATENT DOCUMENTS

| 1602768 | 1/1970 | Fed. Rep. of Germany . |
| 2319076 | 10/1974 | Fed. Rep. of Germany . |
| 1476016 | 2/1967 | France . |
| 1588331 | 4/1970 | France . |
| 2304453 | 10/1976 | France . |
| 1212586 | 11/1970 | United Kingdom | 92/12 |
| 1316836 | 5/1973 | United Kingdom . | |

Primary Examiner—Abraham Hershkovitz
Attorney, Agent, or Firm—Spensley, Horn, Jubas & Lubtiz

[57] ABSTRACT

In this fluid powered positioning system, a sliding assembly includes a slide plate that moves linearly with respect to a frame. A plurality of "working" linear cylinder actuators are mounted to the frame. Each includes a piston and a rod which extends through an opening in the slide plate and terminates at a stop flange. A set of adjustable stop members are mounted to the frame and each is positioned to limit the travel of a respective actuator rod. Appropriate control means applies to a selectable one of the actuators a pressurized fluid, that causes the piston and rod to be moved in a first direction until it is stopped by the associated stop member. In this movement, the stop flange can pull the slide plate to the new location. A "balance" linear actuator cylinder includes a ram that exerts a continuous force in the opposite direction against the slide plate. This "balance" actuator damps and effectively prevents overshoot of the slide plate as it is positioned to each new location. An integral feedback system provides an electrical signal which indicates that positioning has been accomplished and that the slide plate is at the new location.

10 Claims, 13 Drawing Figures

COVER 85 REMOVED

ROBOTICS POSITIONING SYSTEM

BACKGROUND OF THE INVENTION

1. Field of the Invention

The present invention relates to a fluid powered positioning system having easy selectability of the order and locations to which a moving assembly can be automatically positioned.

2. Description of the Prior Art

In the past, automated manufacturing processes have principally been limited to large scale operations in which many thousands or even millions of like items are being fabricated. When such high quantity production is involved, considerable expense can be justified in providing customized automated manufacturing equipment. In the past, however, such automated equipment has by and large been unavailable to smaller scale manufacturing operations. The cost of purchasing automated positioning and parts handling equipment for limited production runs often far exceeds the saving that can be obtained by carrying out the manufacturing operations by machine rather than by human labor.

Thus a need exists for general purpose automation equipment that is low in cost and is sufficiently flexible so as to permit its use economically during low quantity production runs. One general class of equipment that is usable for many manufacturing processes is automatic positioning systems or robots, and a principal object of the present invention is to provide such a system which is sufficiently flexible and low in cost to permit its use in low volume manufacturing applications.

There are many manufacturing processes which require that a certain operation be performed at multiple different locations on a component. For example, a particular part may require several welds to be performed at fixed locations. If the quantity of parts being manufactured is great enough to justify the cost, this welding operation could be achieved by designing a special welding machine with five separate welding heads positioned at the desired locations. Such special tooling is out of the question for small scale operations. However, a similar result can be achieved by mounting the part on an automated positioning table that is controlled sequentially to move the part to the five requisite locations at each of which a conventional welding machine is used to perform individual welds.

Similarly, many manufacturing operations require the insertion of components at particular locations. For example, in electronic equipment, plural components may have to be inserted at corresponding locations on an interconnection board. The use of a positioning table that can move a component such as an electrical interconnection board sequentially to arbitrarily selected locations may enable the operation to be done with a simple component insertion machine, without the necessity for expensive custom equipment.

But although there has been a need for low cost, accurate positioning systems, this need has not been satisfied in the past. One limitation involves the number of available locations or stops to which the table can be moved. Complete flexibility of positioning can be achieved using a stepping or servo motor and calibrated lead screw to position a table along each axis. However, positioning systems utilizing such lead screw drives must have relatively complex electronic systems to accomplish the positioning operation. Such equipment can be programmed to move the table to any desired position, in any desired order, but the cost is high. Even if a smaller manufacturer could afford the capital investment, its use for low quantity runs has another shortcoming. That is, the reprogramming of the system is quite complex. Special training may be required to learn how to enter the requisite commands to step a new part in the correct order to a new set of locations.

If less flexibility is required with respect to the number of locations or their specific position, some low cost systems are available. For example, multi-position linear cylinder actuators are available commercially. In these, a hydraulic or pneumatically actuated cylinder assembly has a piston which can be positioned to two or more discrete locations when the fluid is applied to a corresponding one of a plurality of input ports. Such multi-position cylinders can be used in low cost positioning systems. However, they totally lack flexibility with respect to changing the locations to which the table or other moving assembly can be positioned.

Other low cost positioning systems have used multiple fluid cylinders, each having a different stroke distance, to obtain a certain degree of positioning flexibility. For example, such an automatic pneumatic control system is described in the article entitled "Piggy-back Cylinders Shuttle Work Piece" in Design News, Apr. 17, 1972. In the X-direction four cylinders, two ½-, a 1- and ¼-inch stroke, are mounted in tandem. In the Y-direction, a ⅜- and a 13/16-inch stroke cylinder are mounted in tandem. By controlling the application and release of the cylinders, a selected pattern for movement of the workpiece-supporting table can be achieved.

In another known system, four linear cylinder actuators are used. A first pair is attached to the opposite ends of a first rack gear, and a second set, having a different stroke length from the first, is attached to opposite ends of a second rack gear. The two racks engage the same pinion to rotate the output shaft. By selectively pressurizing individual ones or pairs of the cylinders, five discrete angular output positions of the driven shaft can be achieved.

A distinct shortcoming of such prior art fluid cylinder actuator systems is that the number of different positions that can be achieved is very limited, the specific locations being limited to values set by the cylinder stroke.

Some effort has been made to overcome this limitation. Another known system used pneumatic or hydraulic cylinders to drive a movable table along a pair of slides until the table abuts against an adjustable travel stop or stops mounted on a drum or disc-like member. This type of "bang-bang" system is extremely limited with respect to the number of positions that can be obtained, and with respect to the mass and speed of moving parts. Although some flexibility is available with respect to adjustment of those few positions, the positioning device must return to a home position between moves from one stop position to the next one. In all of the above described systems, the positional feedback is always an "add on" feature, and the required load deceleration mechanism is complex and limits the speed of the slide.

Thus the need exists for a positioning system having the following features:
  (a) relatively low cost;
  (b) multiple stop locations;
  (c) independently adjustable stop locations;

(d) adjustment of the stop locations being simple, and not necessitating complex programming operations;

(e) the order of stops being completely arbitrary and easily selectable;

(f) no requirement that the positioning device return to a "home" position between moves from one stop location to the next;

(g) the ability in a multiaxis embodiment, to move in any order in any axis, so that the positioned article can be moved around an obstacle;

(h) programmable without complex digital equipment;

(i) reasonably low in cost to enable its use in job shop and other low quantity manufacturing operations.

(j) have a simple means of deceleration of moving parts;

(k) have built in integral feedback; and (l) have intrinsical accuracy.

An objective of the present invention is to provide a fluid powered positioning system having all of these benefits.

SUMMARY OF THE INVENTION

This is achieved by providing a fluid powered positioning system in which a sliding assembly is mounted for relative movement with respect to a frame. The sliding assembly is moved by a set of "working" linear cylinder actuators each having a respective adjustable stop member which establishes the limit of travel of the associated "working" actuator piston. Each of these pistons has a stop flange which engages a portion of the sliding assembly. The system also includes at least one "balance" linear cylinder actuator the piston of which also engages the sliding assembly and exerts a force on that assembly in a direction opposite that imparted by the "working" actuator pistons.

To position the sliding assembly, appropriate hydraulic or pneumatic fluid at a first pressure level is applied to a selected one of the "working" actuator cylinders, while fluid of a lesser pressure is applied to the "balance" actuator cylinder. The pressurized "working" cylinder piston moves the sliding assembly to the preset position established by the associated adjustable stop member. The force exerted on the sliding assembly is countered by the force exerted by the "balance" actuator which also damps and corrects overshooting of the sliding assembly as it reaches the stop position. Fast, accurate positioning of the sliding assembly is achieved.

Sequential pressurization of selected "working" actuators results in the corresponding sequential positioning of the sliding assembly to selected different locations set by the respective adjustable stop members. Reprogramming of the positioning system for new stop locations and order of positioning thus is very simple. The new locations are set by adjusting the requisite stop members. The order of positioning is achieved by pressurizing the "working" actuators in the desired order. Several of such units may be coupled together along orthogonal axes to provide a corresponding two- or three-dimensional positioning system for X-Y or X-Y-Z positioning, or for a robot system. In combination with a rack and pinion assembly, rotational positioning also can be achieved.

In an illustrative embodiment, the sliding assembly includes a slide plate mounted perpendicular to the direction of travel. The "balance" actuator piston asserts its force against the slide plate in a first direction. The piston of each "working" actuator extends through a respective clearance opening in the slide plate and has a stop flange at its end. When one "working" actuator is pressurized, the associated piston stop flange pulls the slide plate in the direction opposite that in which force is exerted by the "balance" actuator. The "working" actuator piston moves the slide plate in this direction until the travel of that piston is limited by the associated stop member. Inertial overshoot of the slide plate is damped and corrected by force of the "balance" actuator piston.

At the beginning of a positioning operation, the sliding assembly and slide plate may be situated closer to the stop member then the final position of the stop flange of the pressurized "working" actuator. In this case, the slide plate will not be moved by the "working" actuator piston, but instead will be moved by the force of the "balance" actuator. The piston of the "balance" actuator will move the slide plate in a direction away from the stop member until the slide plate abutts against, and is stopped by, the stop flange of the pressurized "working" actuator.

With this embodiment, an electrical signal readily can be provided to indicate that correct positioning has been achieved. The signal is produced when an electrical series circuit is completed through the slide plate, the stop flange and the piston rod of the pressurized "working" actuator, and the adjustable stop member associated with that actuator. If the piston is not abutting against the stop member, or if the slide plate is not abutting against the stop flange, there will be an open electrical circuit. No signal will be supplied. However, when the final positioning configuration is achieved, with the piston in contact with the adjustable stop member and the slide plate in contact with the stop flange, the electrical circuit will be completed, and a signal will be produced indicating that the sliding assembly is now at the desired location.

Separate such circuits may be provided for each "working" actuator, so that the resultant signals will also indicate the specific position at which the sliding assembly is situated. Alternatively, all of the circuits may be connected in parallel so that a common indicating signal is produced at the end of each move, regardless of the specific location of the sliding assembly at the end of that move. In such an arrangement, the fact that a move has taken place will be indicated by an interruption of this signal while the positioning is taking place.

BRIEF DESCRIPTION OF THE DRAWINGS

A detailed description of the invention will be made with reference to the accompanying drawings, wherein like numerals designate corresponding parts in the several figures.

FIG. 5 shows a pressurized "working" actuator, FIG. 6 shows the "balance" actuator, and FIG. 7 shows a non-pressurized "working" actuator.

DESCRIPTION OF THE PREFERRED EMBODIMENT

The following detailed description is of the best presently contemplated modes of carrying out the invention. This description is not to be taken in a limiting sense, but is made merely for the purpose of illustrating the general principles of the invention, since the scope of the invention best is defined by the appended claims. Operational characteristics attributed to forms of the invention first described also shall be attributed to forms later described, unless such characteristics obviously are inapplicable or unless specific exception is made.

Figure 1:
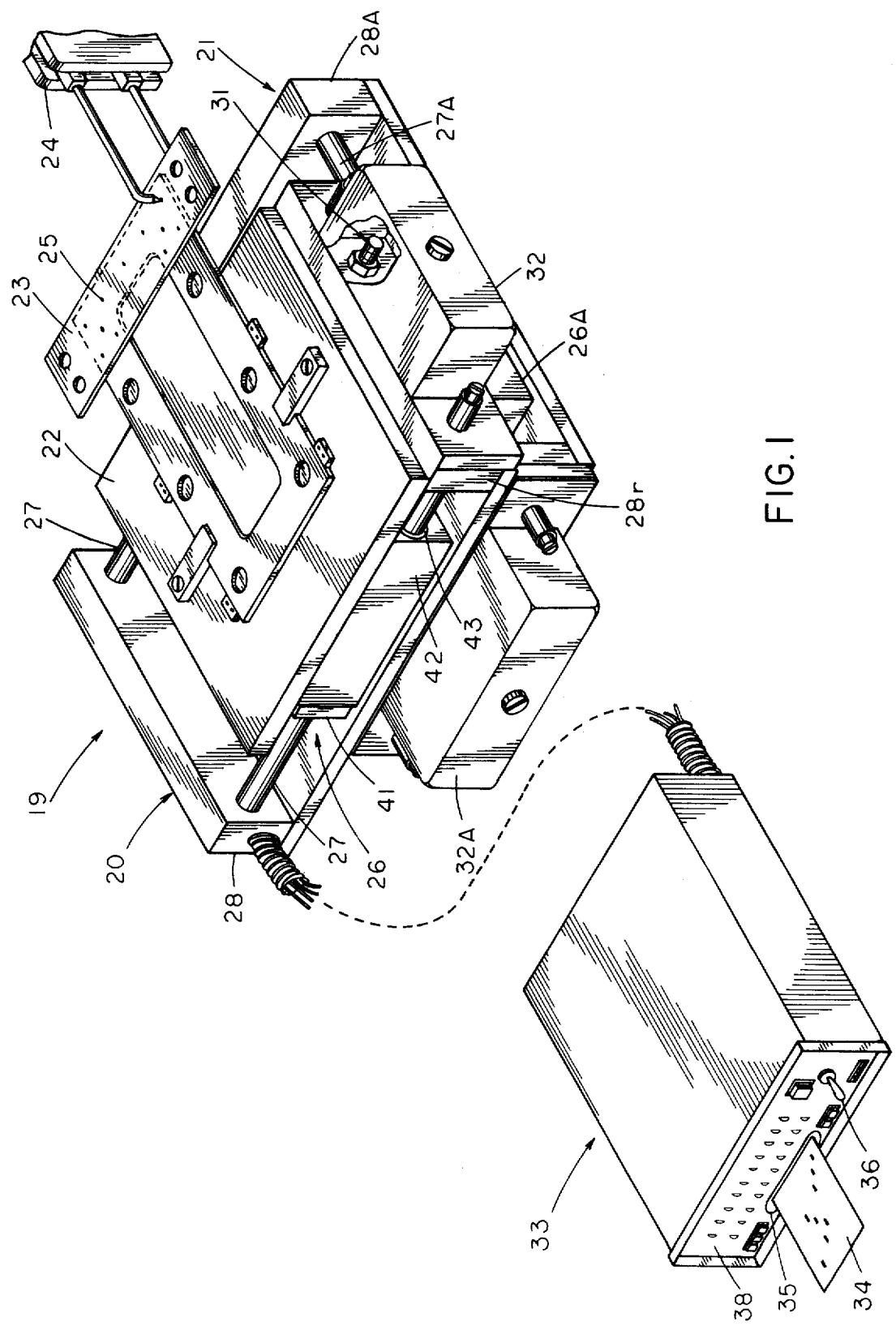
FIG. 1 is a pictorial view of a two-axis fluid powered positioning system in accordance with the present invention.

Referring to FIG. 1, there is shown a two-axis fluid-powered positioning apparatus 19 in accordance with the present invention. It includes a pair of like single axis positioning systems 20, 21 mounted one on top of the other to provide independent positioning of a worktable 22 along respective orthogonal X- and Y- axes. The apparatus 19 typically may be used to sequentially position a workpiece 23, clamped to the table 22, to a set of different X, Y positions with respect to a relatively stationary tool 2A. For example, the workpiece 23 may be a sheet metal assembly or other mechanical component on which a plurality of welds 25 are to be performed by a tool 24 such as a welding machine.

The worktable 22 is part of a sliding assembly 26 which moves linearly along a pair of support rods 27 that are held in a frame 28. In the two axis apparatus of FIG. 1, the frame 28 itself is supported by a like sliding assembly 26A of the lower (Y-axis) positioning system 21. That assembly 26A in turn slides along support rods 27A that are mounted to a frame 28A.

Along each axis there are a plurality (typically 10) of separately selectable locations to which the sliding assembly 26 can be moved. These are set by independent adjustment of respective stop members 31, which advantageously, but not necessarily, may be housed in a cartridge 32. A like set of adjustable stop members, housed in a cartridge 32A, are used for selecting the stop locations along the Y-axis.

Movement of the positioning apparatus 19 is directed by a control unit 33. The desired positioning sequence may, for example, be specified by a punched card 34 that is sensed by a reader 35. For each sequential move, a single hole in one of ten positions designates the particular stop member 31 which is to establish the desired x-axis location. A like single hole in one out of ten positions designates the single stop member in the cartridge 32A that is to determine the y-axis position.

To initiate the positioning operation, a start switch 36 is depressed. The first X- and Y- locations are read from the card 34 and appropriate X- and Y- axis "working" linear cylinder actuators 37 (described below) are pressurized. These respectively cause the sliding assemblies 26 and 26A to move to the locations set by the corresponding adjustable stop members 31. This movement is accomplished rapidly, with fast acceleration and deceleration, and with effective damping and overshoot correction when the stop locations are reached. To confirm that the worktable 22 has been positioned, the control unit 33 provides appropriate signals, which may be used to turn on indicator lamps 38 that tell which X- and Y-axis stop member the worktable 22 is positioned against.

Figure 2:
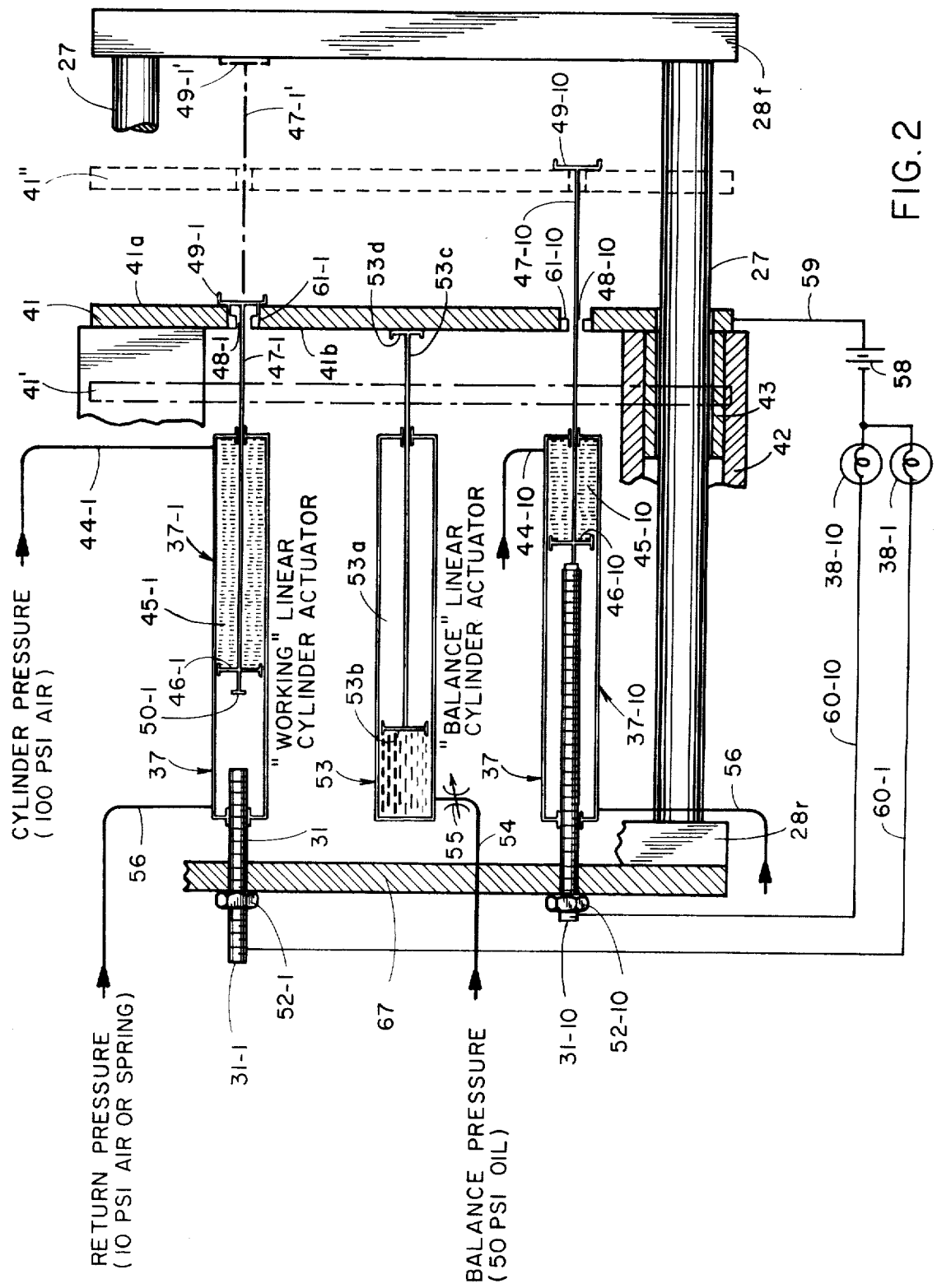
FIG. 2 is a diagram showing the principles of operation of the system of FIG. 1.

The mechanism by which the sliding assembly 26 is moved is illustrated diagrammatically in FIG. 2. The assembly 26 includes a slide plate 41 which moves along the support rods 27. The plate 41 is attached to a pair of slides 42 (FIG. 1) which house linear bearings 43 that engage the support rods 27. The slides 42 in turn support the worktable 22. Thus, movement of the slide plate 41 along the rods 27 imparts corresponding linear movement to the table 22.

Such movement is imparted by an appropriately pressurize one of the plurality of "working" linear cylinder actuators 37. By way of example, movement to the left as viewed in FIG. 2 can be imparted to the slide plate 41 by applying fluid pressure via a line 44-1 to a "working" actuator 37-1. This will result in moving the slide plate 41 from the start position shown in solid lines in FIG. 2 to the end location shown in phantom at 41'.

The typical "working" actuator 37-1 includes a hydraulic or pneumatic cylinder 45-1 within which is situated a piston 46-1 attached to a rod 47-1. This rod extends through an opening 48-1 in the slide plate 41, and has at its end a stop flange 49-1. Such rod 47-1 and stop flange 49-1 constitutes a typical "standby stop member" of the apparatus 19.

When fluid pressure is applied to the cylinder 45-1 via the line 44-1, the piston 46-1 and the standby stop member consisting of the rod 47-1 and the stop flange 49-1 are forced to the left as viewed in FIG. 2. During the motion, the stop flange 49-1 will engage the surface 41a of the slide plate 41 and will force that plate to the left. The slide plate 41 will move along the support rods 27 until the other end 50-1 of the piston rod 47-1 comes into contact with, and is stopped by, an adjustable stop member 31-1 which is one of the set 31 of such members.

Advantageously, but not necessarily, each stop member 31 may comprise a threaded rod or screw which extends through a rear bracket 28r that is part of the frame 28. The position of each stop member 31, and hence the corresponding end movement location of the slide plate 41, can be adjusted by screwing the stop member 31 in or out with respect to the rear bracket 28r. Each member 31 can be locked in position by an appropriate lock nut 52. Thus the end location 41' of the slide plate 41 is established by the position of the stop member 31-1 which is locked in place by the nut 52-1.

Figure 3:
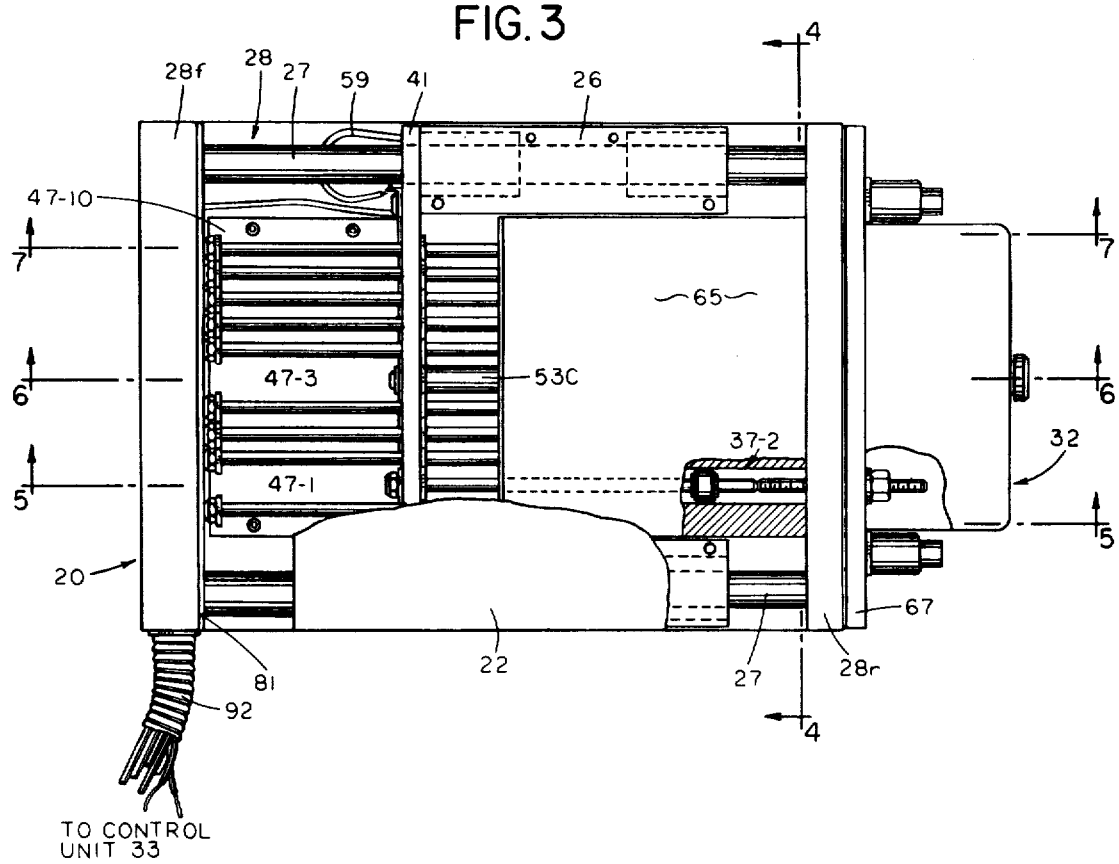
FIG. 3 is a top view of a one-axis positioning system in accordance with the present invention.
Figure 4:
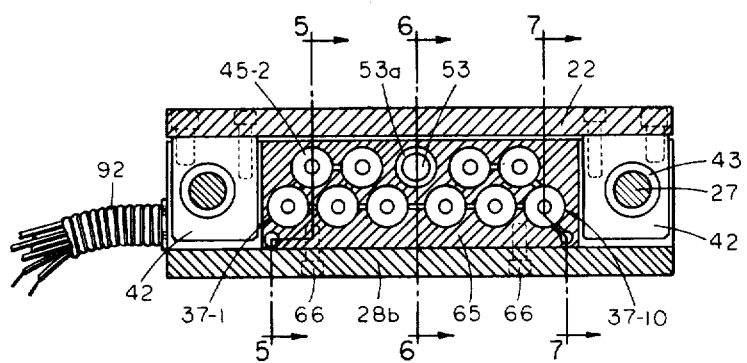
FIG. 4 is a sectional view of the positioning system FIG. 3, as viewed along the line 4—4 thereof. This view shows a typical arrangement of ten "working" actuators and a single "balance" actuator.

Movement of the slide plate 41 to the left (FIG. 2) is countered by the force exerted by a "balance" linear cylinder actuator 53. The positioning system 20 may employ a single such "balance" actuator 53 (as illustrated in FIGS. 3–7), or may use two or more such "balance" actuators. In either case, these "balance" actuators advantageously are symmetrically arranged with respect to the "working" actuators 37. In the examples of FIG. 2 and FIG. 4, the single "balance" actuator 53 is aligned with the center of the slide plate 41, with an equal number of "working" actuators 37 on either side of it.

Schematically the "balance" actuator 53 has a cylinder 53a which contains a piston 53b connected to a rod 53c having a blunt or flange end 53d that abuts against the side 41b of the slide plate 41 which is opposite to the side 41a. Fluid is supplied to the rear of the cylinder 53a via a line 54 and a flow control valve 55. To explain the principle, the pressure of the fluid supplied to the "balance" actuator 53 should be less than, and advantageously about one half of, the pressure supplied to the pressurized "working" actuator 37. By way of example only, the "balance" actuator may be hydraulically pressurized by the supply of a hydraulic fluid (e.g., oil) via a line 54 at 50 pounds per square inch. The "working" actuators 37 may be pneumatically pressurized, for example by supplying air under a pressure of 100 pounds per square inch to the selected one of the supply lines 44. Alternatively, the effective area of the "balance" actuator piston or ram may be substantially less (typically one-half) than that of the "working" actuator piston, and the same or like pressure may be applied to the cylinders 37 and 53a.

With this arrangement, when the slide plate 41 is moved to the left by pressurization of the "working" actuator 37-1, the higher pressure exerted on the piston 46-1 (by the 100 psi air) will overcome the force imparted on the piston 53b (by the 50 psi oil), so that the slide plate 41 will in fact be moved to the end location 41'. The pressure differential between the "working" and the "balance" cylinders is sufficient so that this movement will be at reality high velocity, with fast initial acceleration and rapid deceleration when the rod 47-1 strikes the stop member 31-1. The positioning rate of speed in part is established by the setting of the flow control valve 55.

When the rod 47-1 strikes the stop member 31-1, inertia may cause the sliding assembly 26 and the slide plate 41 to overshoot the end location 41'. However, such overshoot movement will immediately be countered by the opposing force of the "balance" actuator 53. This force will immediately urge the slide plate 41 to the right, up against the stop flange 49-1. Thus any tendency for the slide plate 41 to overshoot or oscillate about the end position 41' will rapidly be damped by the force of the "balance" actuator 53. Note that the counterforce of this "balance" actuator 53 will not move the slide plate 41 to the right, since the force exerted via the "working" actuator 37-1 and its associated stop flange 49-1 exceeds (typically by a factor of two) the "balance" actuator 53 force. The flange 49-1 of the pressurized "working" actuator 37-1 thus functions effectively as a rigid stop that accurately defines the end location 41' of the slide plate 41.

At a later time the slide plate 41 can be positioned from the location 41' to another end location 41" (shown in broken lines in FIG. 2) by releaving the pressure supplied to the "working" actuator 37-1 whereby the associated stop member (consisting of the rod 47-1 and the flange 49-1) become inactive in a standby mode. Then another "working" actuator 37-10 is pressurized so that its associated standby stop member, consisting of the rod 47-10 and the flange 49-10, goes from the standby to the active mode. In this case, the high (typically 100 psi air) pressure supplied via the line 44-10 to the cylinder 45-10 will cause the piston 46-10 and rod 47-10 to abut against the stop member 31-10. The flange 49-10 of the corresponding standby stop member will be held fixably in the position shown in FIG. 2 to serve as a stop defining the movement end location 41" of the slide plate 41. Since this end locations is to the right (as viewed in FIG. 2) of the initial slide plate location 41', no movement is imparted to the slide plate 41 by the "working" actuator 37-10. Rather, movement to the right is imparted by the "balance" actuator 53 under force of the fluid pressure (typically 50 psi oil) supplied via the line 54. The stop flange 49-1 of the "working" actuator 37-1 does not hinder this rightward movement since the cylinder 45-1 now is depressurized. Thus as the slide plate 41 moves to the right under force of the "balance" actuator 53, the piston rod 47-1 may be pulled toward the right by the slide plate 41.

When the slide plate 41 reaches the end location 41", the rightward motion will be stopped by the stop flange 49-10. Inertia of the sliding assembly 26 may urge the slide plate 41 beyond the end location 41". However, such overshoot will immediately be damped by the counterforce exerted by the pressurized "balance" actuator 37-10. Once again, rapid deceleration is achieved with effective damping of any overshoot or oscillation of the slide plate 41. The stop flange 49-10 in cooperation with the relatively high pressurization of the cylinder 45-10 and in cooperation with the stop member 31-10 provides an effective stop which accurately positions the slide plate 41 at the end location 41".

Although not necessary, each of the "working" actuators 37 may be provided with an appropriate means to urge all of the pistons 46 and rods 47 of the unpressurize "working" actuators 37 to the extreme right-hand position (FIG. 2). In this position, each of the stop flanges 49 will abut against the front bracket 28f of the frame 28 as illustrated in phantom by the rod 47-1' and flange 49-1' in FIG. 2. This piston-returning force may be provided by supplying to each cylinder 45, rearward of the respective piston 46, a low pressure pneumatic fluid such as air at 10 pounds per square inch via a line 56. Alternatively (not shown) a low pressure bias spring may be provided within each of the "working" cylinders 45-1 through 45-10 rearward of the respective piston 46-1 through 46-10. If such piston return means is employed, then, when the high pressure is removed from the corresponding "working" actuator line 44, the means will quickly return the corresponding rod to the extreme rightward position of FIG. 2, so that on the next operation (e.g., that illustrated in FIG. 2 between the locations 41' and 41"), the rod 47-1 will not be pulled by the slide plate 41.

FIG. 2 also illustrates the manner in which an electrical signal can be derived using the present invention to confirm that a particular move has been completed and that the slide plate 41 and sliding assembly 26 are at the desired location. The signal is provided by the completion of an electrical circuit including the slide plate 41 and the rod 47 and stop member 31 associated with the pressurized "working" actuator 37. For example, the fact that the slide plate 41 has reached and is situated at the end location 41" will be indicated by the turn-on of an indicator lamp 38-10. One terminal of the lamp 38-10 is connected via a battery 58 and an electrical wire 59 to the slide plate 41, and the other terminal is connected via a wire 60-10 to the stop member 31-10. Advantageously, each of the openings 48-1 through 48-10 of the slide plate 41 is electrically insulated, by means an insulating sleeve 61-1 through 61-10, so that there is no direct electrical contact between the slide plate 41 and the corresponding rod 47. Then, only when the slide plate 41 reaches the location 41" will an electrical circuit be completed that causes the lamp 38-10 to light up. This circuit includes the line 60-10, the stop member 31-10, the piston rod 47-10 which is abutting against the stop member 31-10, the stop flange 49-10 which is abutting against and making electrical contact with the surface 41a of the slide plate 41, the slide plate 41, the line 59 and the battery 58. With this arrangement, the lamp 38-10 will only be lit up when the sliding assembly 26 and slide plate 41 are in the desired location 41". A similar electrical circuit may be provided for each of the other "working" actuators 37. For example, in FIG. 2 the lamp 38-1 is associated with the "working" actuator 37-1 and will only be lit when the slide plate 41 reaches and is firmly situated at the location 41'.

Structural details of an illustrative embodiment of the positioning system 20 are shown in FIGS. 3-7. There, the single, centrally located "balance" actuator 53 and ten "working" actuators 37-1 through 37-10 all have their cylinders formed in a common actuator body 65 that is mounted to the bottom member 28b of the frame 28 by means of screws 66 (FIG. 4). All of the adjustable stop members 31-1 through 31-10 are fixed to a plate 67 that is part of the detachable cartridge 32 and which is removably attached to the rear frame member 28r. To facilitate cartridge removal, each of the stop members 31-1 through 31-10 extends through a corresponding clearance opening 68-1 through 68-10 (FIGS. 5 and 7) of the rear bracket 28r.

Figure 6:
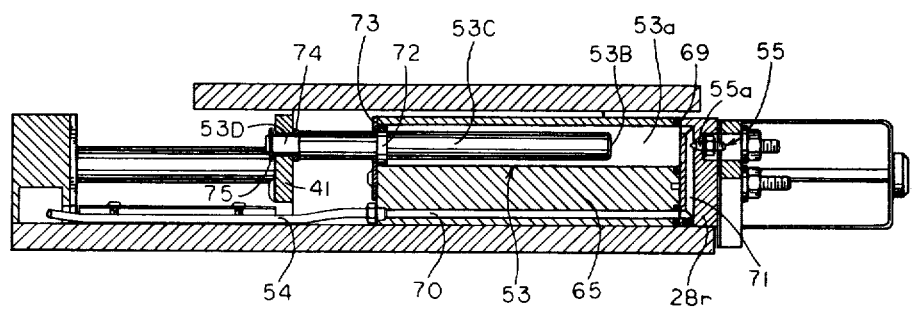

As shown in FIGS. 4 and 6, the cylinder 53a of the "balance" actuator 53 comprises a bore extending lengthwise through the actuator body 65. The rear end of this bore 53a is enclosed by the frame rear bracket 28r, and hydraulic fluid leakage is prevented by a seal 69. The hydraulic fluid line 54 communicates to the cylinder bore 53a via a horizontal channel 70 extending through the body 65 and a generally vertical channel 71 extending through the bracket 28r. The flow control valve 55 advantageously comprises a needle valve having a threaded member 55a that extends through a portion of the bracket 28r. The flow controlling needle is formed at one end of the member 55a and extends into the channel 71. The other end of the member 55a is accessable at the rear of the bracket 28r to permit external adjustment of the hydraulic fluid flow control rate. As noted earlier, such adjustment in part determines the positioning rate of speed of the slide plate 41 and the sliding assembly 26.

In the embodiment of FIG. 6, the rear end 53B of a ram 53C functions as the piston for the "balance" actuator 53. Fluid leakage from the cylinder bore 53a is prevented by a seal 72 which is held in place by a seal cover 73 at the front end of the body 65. The ram 53C moves or reciprocates with respect to the seal 72. The end 53D of the ram is attached to the slide plate 41. In the embodiment shown, the end 53D is of narrower diameter than the rest of the ram 53C and passes through an opening in the slide plate 41. An elastic ring 74 is situated between a shoulder on the ram 53C and the slide plate 41 so that force is transmitted by the "balance" actuator 53 to the slide assembly 26 via the elastic ring 74. A removable ring or flange 75 retains the ram end 53D attached to the slide plate 41. If the effective area of the ram end 53B is substantially less (typically one-half) than the effective area of each piston 46-1 through 46-10, then the pressure of the fluid supplied to the "balance" actuator 53 may be the same as, or near to, the pressure of the fluid applied to the "working" actuators 37-1 through 37-10.

Figure 5:
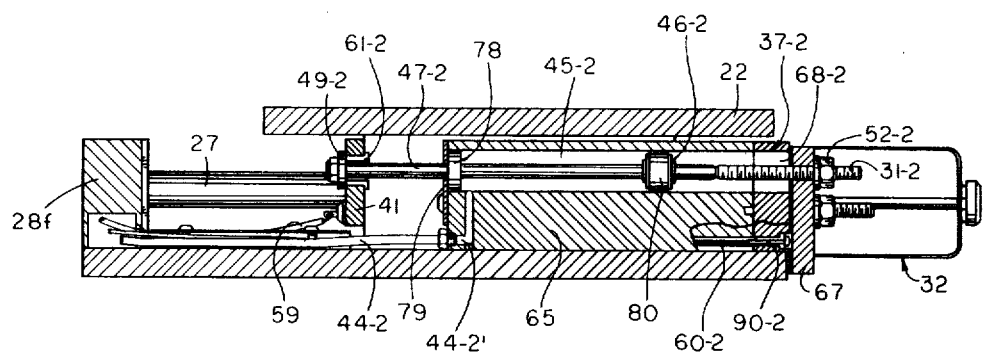
FIGS. 5, 6 and 7 are sectional views of the positioning system of FIG. 3 as seen respectively along the lines 5—5, 6—6 and 7—7 thereof.
Figure 7:
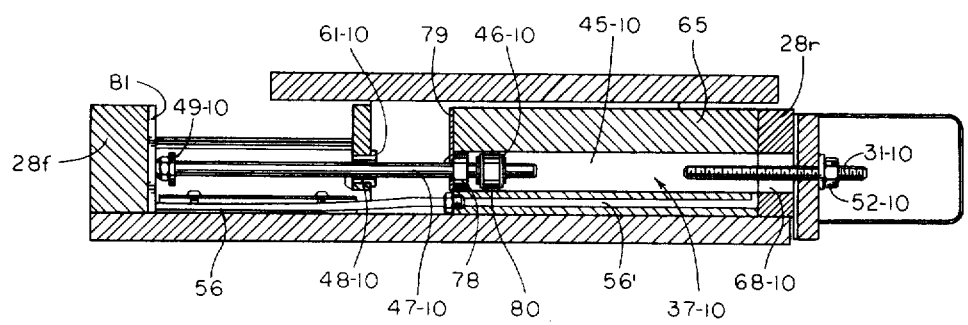

FIGS. 5 and 7 shown typical "working" actuators 37-2 and 37-10. Each actuator cylinder 45-1 through 45-10 consist of a longitudinal bore through the actuator body 65. The front end of each such cylinder bore is covered by a seal 78 held in place by a seal cover 79. Each piston 46-1 through 46-10 is surrounded by a corresponding seal 80 which prevents the flow of pneumatic fluid between the cylinder regions in front of and behind each respective piston 46.

FIG. 5 shows one of the individual high pressure pneumatic fluid lines 44-2 which communicates to the front portion of the actuator cylinder 45-2 via a channel 44-2' in the body 65. A like, individual high pressure pneumatic fluid line and channel (not shown) is provided for each of the other "working" actuators 37. FIG. 7 shows the low pressure pneumatic fluid line 56 which is connected to the rear portion of each actuator cylinder 45-1 through 45-10 for the purpose of returning all of the presently unused "working" actuator rods 47 to the rest position shown FIG. 7. The line 56 is connected via a set of channels 56' in the body 65 to the rear end of all of the cylinders 45-1 through 45-10. As shown in FIGS. 3, 5 and 7, only the "working" actuator 37-2 (FIG. 5) has high pressure applied to it via its associated line 44-2. It is this "working" actuator 37-2 which establishes the position of the slide plate 41 in the configuration of FIGS. 3 and 5. All of the other "working" actuators 37-1 and 37-3 through 37-10 do not have high pressure fluid applied. However, the low pressure fluid supplied via the line 56 and the channels 56' force all of the corresponding rods 47-1 and 47-3 through 47-10 into the extreme extended position with the corresponding stop flanges 49 in abuttment with the frame front bracket 28f. A resilient bumper 81 may be provided on the bracket 28f to act as a cushion for the stop flanges 49. Also evident in FIGS. 3 and 5 is the electrical wire 59 that is connected to the slide plate 41.

Figure 8:
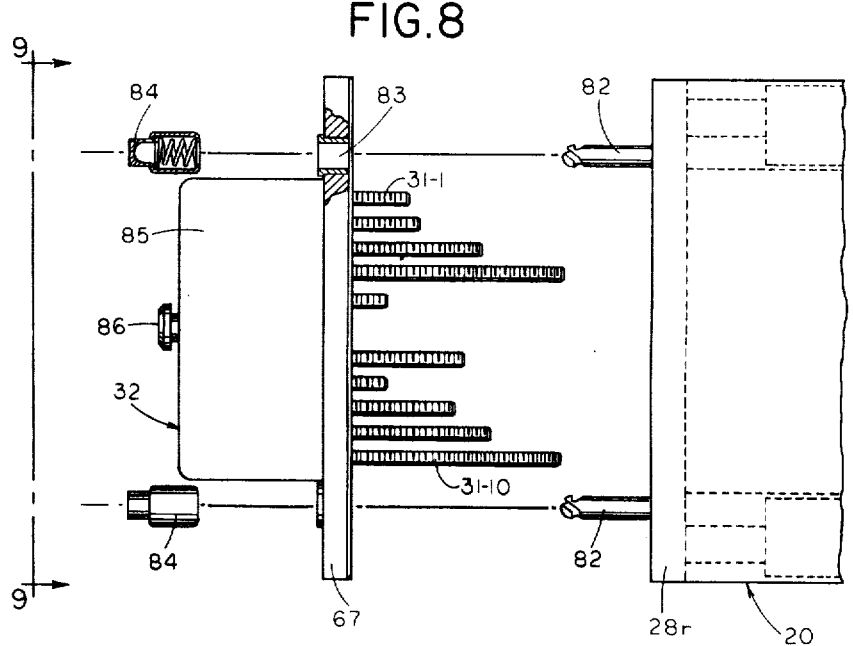
FIG. 8 is a side view of a plug-in cartridge that contains all of the adjustable stop members for the positioning system of FIG. 3.
Figure 9A:
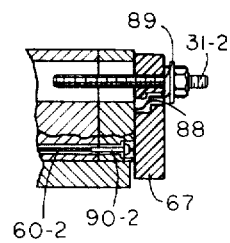
FIG. 9 is a view along the line 9—9 of FIG. 8 showing the individual stop members uncovered and FIG. 9A is a transverse sectional view showing an individual electrical connection to a typical one of the stop members.
Figure 9:
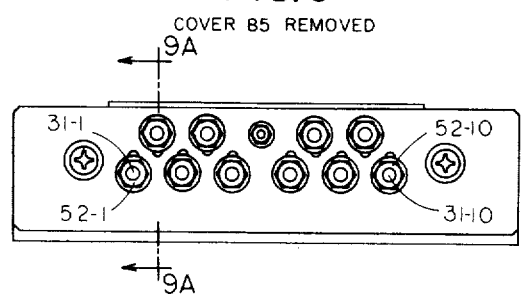

Details of the cartridge stop 32 are shown in FIGS. 8, 9 and 9A. As discussed above, all of the adjustable stop members 31-1 through 31-10 are mounted to a cartridge plate 67. This plate 67 itself is attached to the frame rear bracket 28r by a pair of studs 82 which extend rearwardly from the bracket 28r and pass through openings 83 in the cartridge plate 67. A pair of quick release nuts 84 engage the studs 82 to secure the cartridge in place. A cover 85 is removably attached to the cartridge plate 67 by a knob and threaded shaft 86. The cover 85 may be removed to permit adjustment of the individual stop members 31.

FIGS. 5 and 9A indicate one manner in which the electrical connections 60-1 through 60-10 can be made to the individual stop members 31. This can be accomplished by fabricating the cartridge plate 67 of electrically insulating material and connecting an electrical wire 88 (FIG. 9A) between a lug 89 attached to each respective stop member 31 and an electrical plug 90 extending forwardly of the cartridge plate 67. As shown in FIG. 5, when the cartridge 32 is in place, each plug 90 is in electrical communication with a socket associated with the corresponding wire 60. Thus in FIG. 5, the plug 90-2 is shown engaging a socket associated with the wire 60-2. All of the wires 60 may extend through the body 65. This enables all of the wires 60 and all of the individual high pressure pneumatic lines 44-1 through 44-10 to be brought out from the frame 28 as a single bundle 92 (FIGS. 3 and 4) for connection to the control unit 33.

Figure 10:
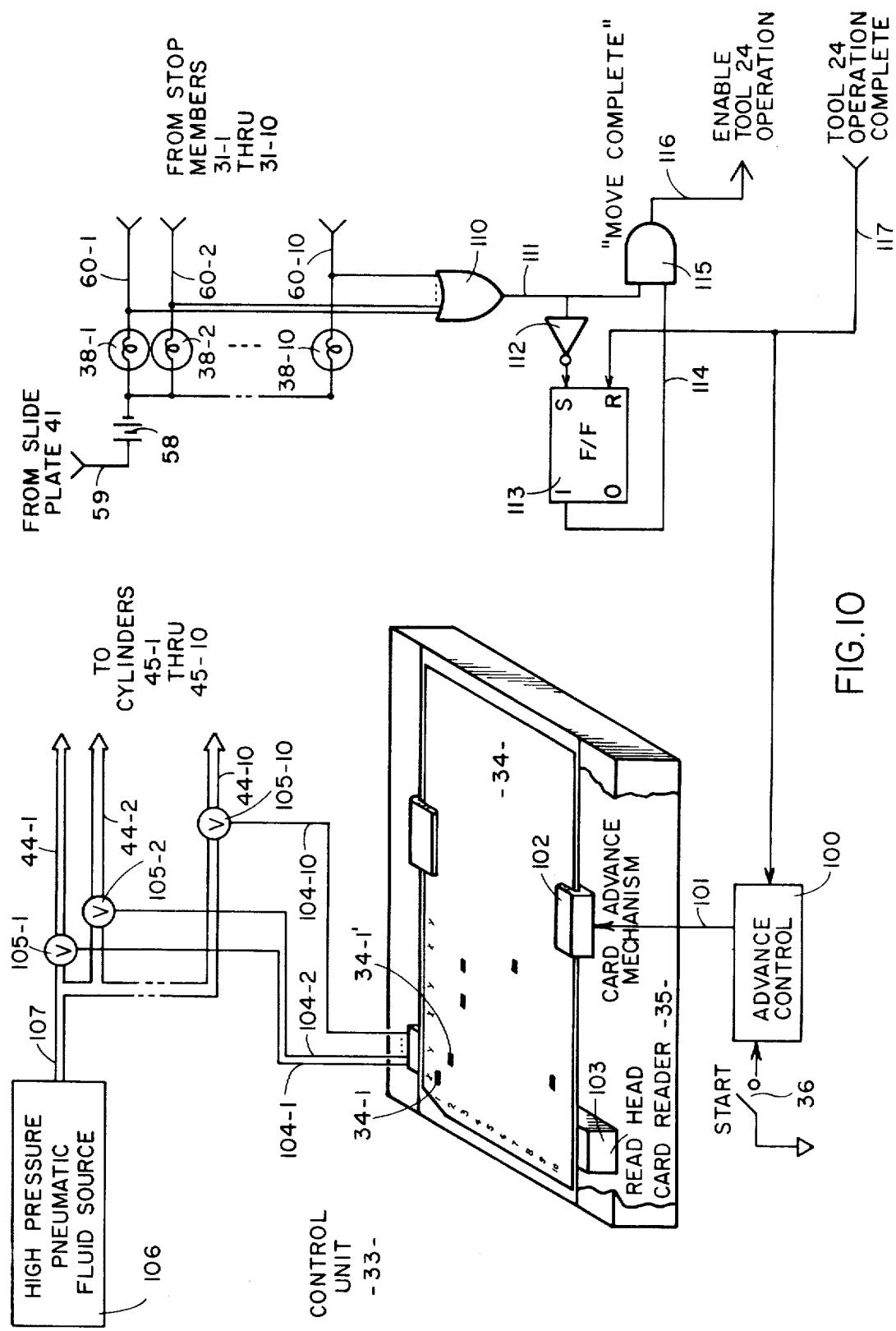
FIG. 10 is a diagrammatic view of a simple control unit for the positioning system of FIG. 3.

An illustrative embodiment of the control unit 33 is shown in FIG. 10. Here the card 34 has ten rows any one of which can be punched to indicate which corresponding "working" actuator 37 is to be pressurized in the positioning system 20 for the X- axis control and in the positioning system 21 for Y- axis control. In FIG. 10 only the X- axis circuitry and control members are shown; like members may be employed for control of Y- axis movement.

Closure of the start switch 36 causes an advance control circuit 100 to provide a signal on a line 101 that causes a mechanism 102 in the card reader 35 to advance the card 34 so that the first two columns 34-1 and 34-1' thereof will be situated above a read head 103. This is a conventional unit which senses the row location of the punched hole in each of the rows 34-1 and 34-1'. In the embodiment of FIG. 10, the location of the hole in the column 34-1 controls X- axis movement and the hole in the column 34-1' controls Y- axis movement.

For the X- axis control, the read head 103 provides a signal on one of the ten lines 104-1 through 104-10 corresponding to the single punched hole. In the example illustrated, a hole has been punched in the first row of column 34-1, indicating that the sliding assembly 26 (FIG. 1) is to be move to the position established by the "working" actuator 37-1. Accordingly, an electrical signal is provided on line 104-1 which opens a corresponding valve 105-1. All other valves 105-2 through 105-10 are closed. Accordingly, high pressure pneumatic fluid from a source 106 is supplied via a line 107 and the open valve 105-1 to the line 44-1 that lead to the cylinder 45-1. As described above, this will cause the "working" actuator 37-1 to move the sliding assembly 26 to the corresponding location.

When the move is completed, the lamp 38-1 will go on, as described above in connection with FIG. 2. Additional circuitry is provided in the control unit 33 then to enable operation of the tool 24 and, after the tool operation has been completed, to move the card 34 to the next position so as to initiate movement of the positioning apparatus 19 to the next desired location.

To this end, all of the lines 60-1 through 60-10 are connection to an OR - gate 110, a high output from which on a line 111 will indicate that at least one of the lamps 57-1 through 57-10 is lit, i.e., that the positioning system 20 is situated at a specific location controlled by one of the "working" actuators 37. To insure that the move has actually taken place, this signal on the line 111 is inverted by an inverter 112. The output of the inverter 112 thus is high only when there is no completed electrical circuit through the slide plate 41. In other words, a high signal from the inverter 112 will only occur when none of the "working" actuators 37 is presurized. This will occur e.g., before the initial positioning operation, or during an actual positioning operation when the sliding assembly 26 is being moved between two locations.

The high output from the inverter 112 is used to set a flip/flop 113 to the "1" state in which a high signal is provided on a line 114 to enable an AND - gate 115. Thereafter, when the sliding assembly 26 has reached the desired end location, the OR-gate 110 again will provide a high signal on the line 111. As a result, a high signal is supplied from the AND - gate 115 on a line 116. This signal indicates that the move has been completed. The signal on the line 116 may be used to enable operation of the tool 24, since it is now known that the workpiece 23 is properly positioned for the next tooling operation.

When the tool 24 has completed its operation, a signal is provided on a line 117. This signal resets the flip/flop 113 thereby terminating the tool enabling signal on the line 116. In addition, the signal on the line 117 causes the advance control 100 to provide another signal on the line 101 which makes the mechanism 102 advance the card 34 to the next position. This initiates the next movement cycle of the positioning system 20. The present invention is not limited to the specific control unit embodiment shown in FIG. 10; other control mechanisms may be used.

In the embodiment of FIGS. 1 through 10, reprogramming the location and order of positioning is very simple. The stop members 31-1 through 31-10 in the cartridge 32 are reset to the new desired end locations. A new card 34 is punched with the new positioning order. The system then is ready to perform the new set of sequential positioning operations.

Figure 11:
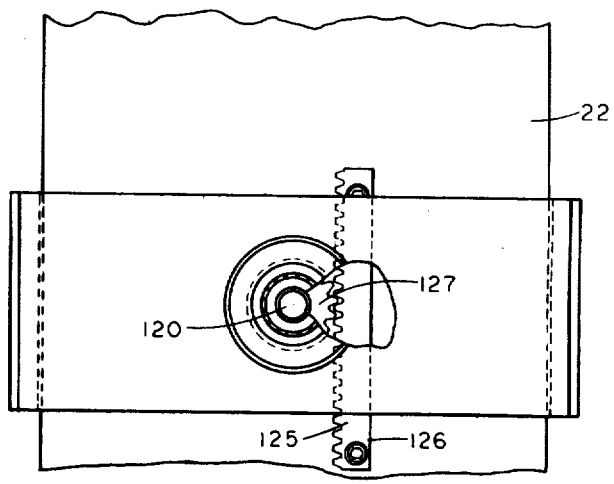
FIGS. 11 and 12 respectively show a top and a transverse sectional view of an embodiment in which the positioning system of FIG. 3 is used to control the rotational position of a shaft.
Figure 12:
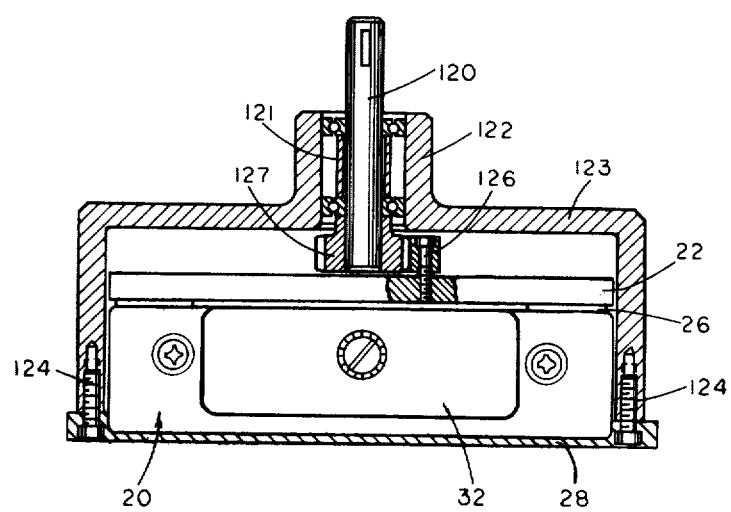

FIGS. 11 and 12 show how the positioning system 20 can be adapted to impart controlled angular rotation to a shaft 120. To this end, the shaft 120 is journaled in a bearing assembly 121 situated in a boss 122 that is part of a generally inverted-U-shaped support 123. The support 123 straddles the sliding assembly 26 and is fastened to the frame 28 thereof by means of bolts 124.

A rack gear 125 is attached to the table 22 by means of screws 126. The rack gear 125 engages a pinion gear 127 attached to the bottom of the shaft 120. With this arrangement, as the system 20 positions the table 22 to a preset location, the rack and pinion gears 125, 127 will impart a corresponding fixed degree of angular rotation to the shaft 120. Controlled angular positioning is achieved.

I claim:

1. A positioning apparatus comprising:
   a frame,
   a sliding assembly mounted to said frame for movement relative thereto, said sliding assembly including a slide plate,
   at least one "balance" linear cylinder actuator stationarily mounted to said frame and having a ram contactable with said slide plate, and first means for providing a first fluid to the cylinder of said "balance" actuator to bias said ram and hence said slide plate in a first direction,
   at least one "working" linear cylinder actuator stationarily mounted to said frame and having a piston fixedly attached to a rod, said rod independently movably extending through said slide plate,
   a stop flange fixedly attached to said "working" actuator rod for engagement with said slide plate, said stop flange being on the side of said slide plate opposite from said "working" actuator cylinder, said "working" actuator piston, rod and attached stop flange being unitarily movable independently of said slide plate, and second means for selectively providing a second fluid to the cylinder of said "working" actuator to force the piston and rod thereof in a second direction opposite to said first direction, said stop flange then urging said slide plate in said second direction,
   an adjustable stop member, mounted to said frame and positioned to limit the travel of said "working" actuator rod in said second direction, so that when said second means provides fluid to said "working"

actuator cylinder the piston and rod thereof can move said slide plate and sliding assembly in said second direction, overcoming the force of said "balance" actuator, until said rod is stopped against said adjustable stop member, said "balance" actuator and ram damping and correcting overshoot of said slide plate so that said sliding assembly is accurately positioned at a location set by the adjustment of said stop member.

2. A positioning apparatus according to claim 1 wherein the second fluid selectively provided by said second means has a pressure on said slide greater than the pressure of the first fluid provided by said first means.

3. A positioning apparatus according to claim 2 further comprising means for biasing the pistons of each "working" actuator in said first direction, said biasing being at a sufficiently low force as to be overcome by the force of said second fluid.

4. A positioning apparatus according to claim 1 wherein there are a plurality of said "working" actuators and a like plurality of adjustable stop members each limiting the travel of a respective "working" acutator piston rod, and wherein said second means independently, sequentially supplies second fluid to said plurality of "working" actuators one at a time in a preselected order, so that said sliding assembly will be correspondingly sequentially positioned to plural locations established by said adjustable stop members.

5. A positioning apparatus according to claim 1 wherein said slide plate, said "working" actuator piston, rod and stop flange and said adjustable stop member are electrically conductive, and further comprising;
electrical circuit means for providing a signal upon the establishment of an electrical circuit including said slide plate, said "working" actuator rod and stop flange and said adjustable stop member, said signal indicating that said sliding assembly has been positioned at a location established by said stop member.

6. A positioning apparatus according to claim 5 wherein said electrical circuit means further includes circuitry for ascertaining that said sliding assembly has actually been repositioned from one location to another location by sensing the interruption of said provided signal which occurs during said repositioning.

7. A fluid powered positioning system for sequentially, linearly positioning a sliding assembly to a plurality of selectable locations relative to a frame, comprising:
a slide plate attached to said sliding assembly,
a set of linear cylinder actuators mounted to said frame, each having an associated cylinder, piston and rod, each rod extending through a clearance opening in said slide plate and terminating in a stop flange,
a set of adjustable stop members mounted to said frame and each positioned to limit the travel of an associated one of said actuator pistons,
selectable fluid applying means for applying a pressurizing fluid to a selected one of said actuator cylinders so as to cause the associated piston, rod and stop flange to move in a first direction until travel of said rod is stopped by the associated stop member, the associated stop flange being able to move said slide plate and sliding assembly in said first direction during such piston, rod and stop flange movement, and
balance force applying means for substantially continuously applying to said slide plate a force in a direction opposite to said first direction and of a value less than that impartable to said slide member by said stop flange during its movement,
said slide plate and said sliding assembly being moved to a new location upon application of pressurizing fluid by said applying means, movement being imparted to said slide plate either by said stop flange or by said balance force applying means, said balance force applying means damping and correcting overshoot of said slide plate when it reaches said new location.

8. The system of claim 7 wherein;
said balance force applying means comprises one or more other linear cylinder actuators mounted to said frame and each having a ram operatively connected to said slide member, the linear cylinder actuators in said set being symmetrically situated with respect to said one or more other actuators so as to minimize torque on said slide plate.

9. The system of claim 7 wherein said fluid applying means applies a pneumatic pressurizing fluid to the selected actuator cylinder, and wherein said other linear cylinder actuators in said balance force applying means are hydraulically pressurized.

10. The system of claim 9 further comprising a source of hydraulic pressurizing fluid connected to said other linear cylinder actuators via a line, and a flow control valve in said line, the setting of said valve in part establishing the rate of speed of movement of said sliding assembly and the extent of damping of slide plate motion provided by said balance force applying means.

* * * * *